No. 698,008. Patented Apr. 22, 1902.
F. W. GORDON.
CHANGE GEARING.
(Application filed Jan. 11, 1902.)
(No Model.)
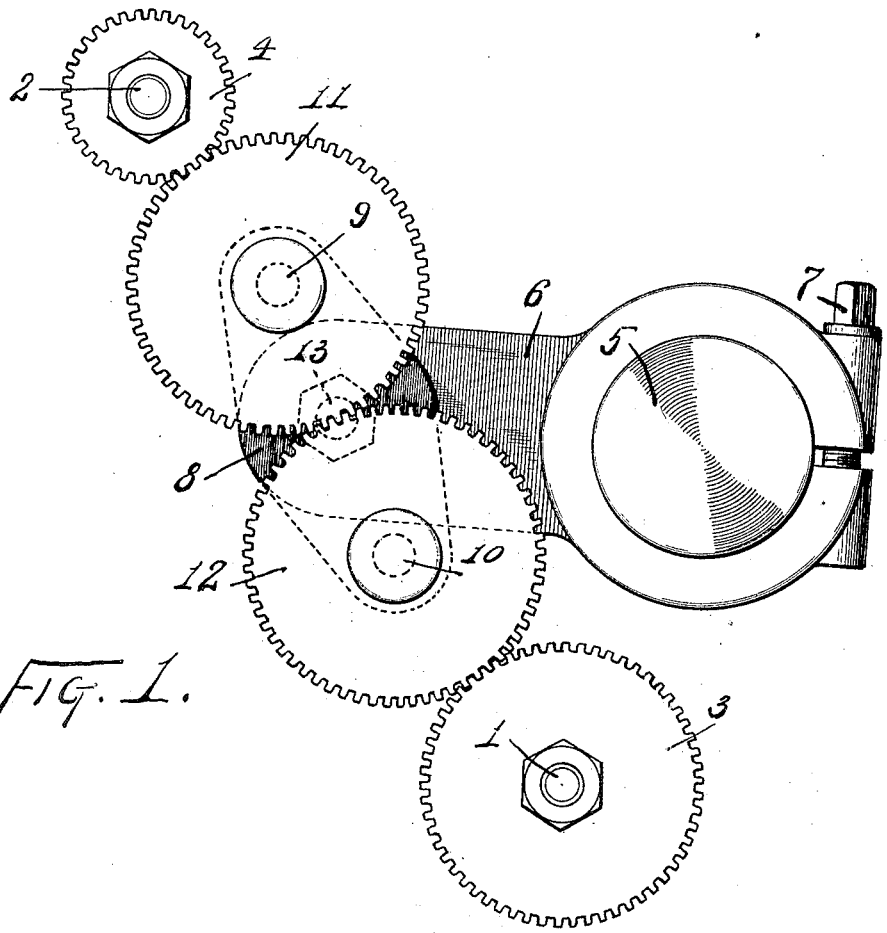
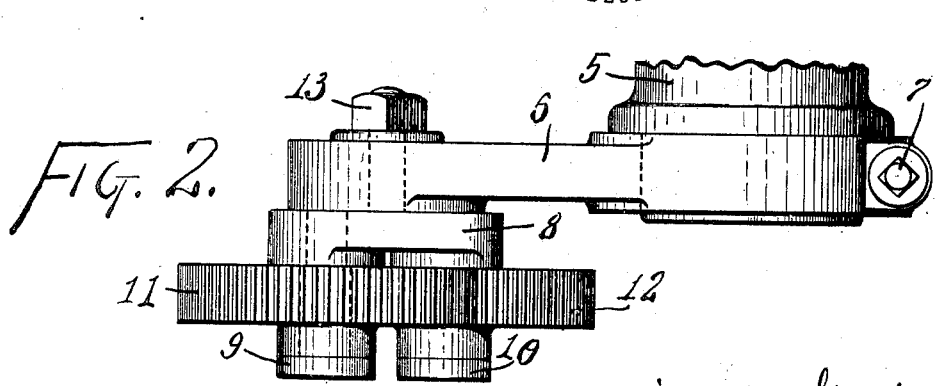
Witnesses:
E. R. Shipley.
M. S. Belden.
Frederick W. Gordon
Inventor
by James W. See
Attorney
THE NORRIS PETERS CO., PHOTO-LITHO., WASHINGTON, D. C.

UNITED STATES PATENT OFFICE.

FREDERICK W. GORDON, OF HARTFORD, CONNECTICUT, ASSIGNOR TO PRATT & WHITNEY COMPANY, OF HARTFORD, CONNECTICUT.

CHANGE-GEARING.

SPECIFICATION forming part of Letters Patent No. 698,008, dated April 22, 1902.

Application filed January 11, 1902. Serial No. 89,371. (No model.)

*To all whom it may concern:*

Be it known that I, FREDERICK W. GORDON, a citizen of the United States, residing at Hartford, Hartford county, Connecticut, (post-office address care Pratt & Whitney Company, Hartford, Connecticut,) have invented certain new and useful Improvements in Change-Gearing, of which the following is a specification.

This invention relates to improvements in change-gearing, such as is often or generally used in engine-lathes, where the speed ratio between the arbor and the lead-screw is altered by applying selective gears to them, the gap between these gears being filled by one or more intermediate gears adjusted to suit the gap. The intermediates have generally been radially adjusted on an angularly-adjustable "quadrant," as it is usually called, the quadrant swinging on the axis of one of the terminal gears of the series, the adjustment of the intermediate being effected by first moving the intermediate toward the axis of the quadrant till it is properly geared with the main gear at that axis, then securing the axis of the intermediate firmly to the quadrant, and then angularly adjusting and fixing the quadrant in such position that the intermediate would properly mesh with the second main gear.

My present invention relates to an intermediate system avoiding the necessity for a slotted quadrant.

My improvement will be readily understood from the following description, taken in connection with the accompanying drawings, in which—

Figure 1 is a face view of a change-gear system embodying my invention, and Fig. 2 a plan of the same.

In the drawings, 1 indicates the axis of one of the terminal gears of the system, which axis may well be assumed to be the lead-screw of an engine-lathe arranged, as usual, to have conveniently applied to it any selected one of a series of change-gears; 2, the axis of the other terminal gear of the series, which axis may well be assumed as the spindle of the engine-lathe, arranged, as usual, to receive a selected gear of a series of change-gears; 3, one of the terminal change-gears, secured upon the axis 1; 4, the other terminal change-gear, secured upon the axis 2; 5, a pivot fixed in the general neighborhood of and parallel with the two axes 1 and 2; 6, an arm mounted on pivot 5, which arm will be herein termed the "quadrant," that being the name most commonly used even if improperly applied to the corresponding part in change-gear system; 7, a clamp by means of which arm 6 may be firmly fixed in adjusted angular position upon pivot 5; 8, an arm mounted on arm 6 on a pivot having its axis parallel with that of pivot 5; 9, a bearing for an intermediate gear, carried by arm 8, its axis being parallel with that of pivot 5; 10, a second bearing for an intermediate gear, similarly carried by arm 8; 11, an intermediate gear carried by bearing 9 and adapted to engage with gear 4; 12, an intermediate gear carried by bearing 10 and permanently meshing with gear 11 and adapted to mesh with gear 3, and 13 the pivot uniting arm 8 to arm 6, this pivot being a clamping-pivot providing for the fixing of arm 8 relative to arm 6 after it has been angularly adjusted thereon.

Gears 11 and 12 are permanent parts of the intermediate system and in most cases will never need changing, as the system well provides for these two gears properly making the connection between any two terminal gears in a well-designed change-gear system. These two intermediate gears are capable of filling any gap not greater in extent than their joint diameters. It is obvious that by angularly adjusting arm 8 upon arm 6 and by angularly adjusting arm 6 upon pivot 5 the intermediates can be adjusted into proper meshing relationship with the terminal gears of the system. The device avoids the necessity for the usual unsatisfactory slot arrangement for the intermediate.

A little analysis of the system will show that the position of pivot 5 is immaterial so long as it is in the general neighborhood of the axes of the terminal gears and the length of arm 6 is appropriate. It is obvious that the axis of pivot 5 may even coincide with the axis of either of the terminal gears of the system. Clamp 7, it will be readily understood, is merely exemplifying in character. The size of gears 11 and 12 is immaterial so long as these gears mesh with each other and are adapted to fill the greatest gap in the system, and these two gears need not be the same size. The positions of bearings 9 and 10 with reference to pivot 13 may be varied in construction, it not being necessary that arm 8 have arms of equal length or even that pivot 13 be disposed between bearings 9 and 10, nor is it necessary that the intermediate system of gears carried by arm 8 be limited to two gears.

I claim as my invention—

In change-gearing, the combination, substantially as set forth, of two change-gears of a train, means for varying the gap between said two gears, an arm mounted for angular adjustment on an axis parallel with the axes of the change-gears, an arm mounted on the first-mentioned arm and angularly adjustable thereon on an axis parallel with the axes of the change-gears, and intermeshing gears carried by said second arm and adapted to engage the change-gears and fill the variety of gaps therebetween.

FREDERICK W. GORDON.

Witnesses:
W. M. STORRS,
CHAS. V. MUNGER.